US010098153B2

(12) United States Patent
Padden

(10) Patent No.: US 10,098,153 B2
(45) Date of Patent: Oct. 9, 2018

(54) NETWORK TRAFFIC PRIORITIZATION

(71) Applicant: Cable Television Laboratories, Inc., Louisville, CO (US)

(72) Inventor: Joseph Padden, Boulder, CO (US)

(73) Assignee: Cable Television Laboratories, Inc, Louisville, CO (US)

( * ) Notice: Subject to any disclaimer, the term of this patent is extended or adjusted under 35 U.S.C. 154(b) by 0 days.

(21) Appl. No.: 15/288,902

(22) Filed: Oct. 7, 2016

(65) Prior Publication Data
US 2017/0041958 A1 Feb. 9, 2017

Related U.S. Application Data

(62) Division of application No. 14/537,845, filed on Nov. 10, 2014, now Pat. No. 9,468,020.

(60) Provisional application No. 62/052,501, filed on Sep. 19, 2014.

(51) Int. Cl.
*H04W 74/08* (2009.01)
*H04W 28/02* (2009.01)
*H04W 24/10* (2009.01)
*H04W 72/10* (2009.01)
*H04W 88/10* (2009.01)
*H04W 84/12* (2009.01)

(52) U.S. Cl.
CPC ....... *H04W 74/0816* (2013.01); *H04W 24/10* (2013.01); *H04W 28/0205* (2013.01); *H04W 72/10* (2013.01); *H04W 84/12* (2013.01); *H04W 88/10* (2013.01)

(58) Field of Classification Search
CPC ............. H04W 74/0816; H04W 24/10; H04W 28/0205; H04W 72/10; H04W 84/12; H04W 88/10
See application file for complete search history.

(56) References Cited

U.S. PATENT DOCUMENTS

| 2008/0144588 | A1* | 6/2008 | Mezer | H04L 41/5022 370/338 |
| 2016/0043953 | A1* | 2/2016 | Ringland | H04W 28/0231 370/230 |
| 2016/0065330 | A1* | 3/2016 | Jeon | H04W 72/085 370/338 |

* cited by examiner

*Primary Examiner* — Walli Butt
(74) *Attorney, Agent, or Firm* — Armstrong Teasdale LLP

(57) ABSTRACT

Management of throughput, link rate, airtime, access, collision probability and other factors influencing performance of a wireless access point configured to wirelessly support two or more networks over the same radio channel and/or antenna is contemplated. The management may be suitable for use with access points operating according to a Distributed Coordination Function (DCF) based on Carrier Sense Multiple Access with Collision Avoidance (CSMA/CA) whereby each device desiring airtime executes a random binary backoff procedure or other suitable contention based process before attempting to access the channel.

6 Claims, 4 Drawing Sheets

NETWORK TRAFFIC PRIORITIZATION

CROSS-REFERENCE TO RELATED APPLICATIONS

This application claims the benefit of U.S. provisional Application No. 62/052,501 filed Sep. 19, 2014, and U.S. non-provisional application Ser. No. 14/537,845 filed Nov. 10, 2014, the disclosures of which are incorporated in their entirety by reference herein.

TECHNICAL FIELD

The present invention relates to managing wireless access points, such as but not necessarily limited to managing throughput, link rate, airtime, access, collision probability and other factors influencing performance of the wireless access point when configured to wirelessly support two or more networks over the same radio channel and/or antenna according to the Institute of Electrical and Electronics Engineers (IEEE) 802.11 standards (Wi-Fi).

BACKGROUND

Internet service providers (ISPs) are increasingly offering IEEE 802.11 based Wi-Fi services to customers. The proliferation of Wi-Fi enabled devices and the demand for ubiquitous connectivity has driven the ISPs to explore creative ways to increase their service coverage footprint. One approach, referred to as "Community Wi-Fi," involves the deployment of customer premise modems (cable, DSL, or fiber) configured for supporting two or more networks (SSIDs) from a single radio broadcast. Such an arrangement may include one SSID designating a private network for the home or business users while the remaining SSIDs are public networks for anyone near the residence or business to use. This approach enables ISPs to leverage their installed equipment base to further extend their coverage area with use of a single radio configured to act as multiple virtual access points.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
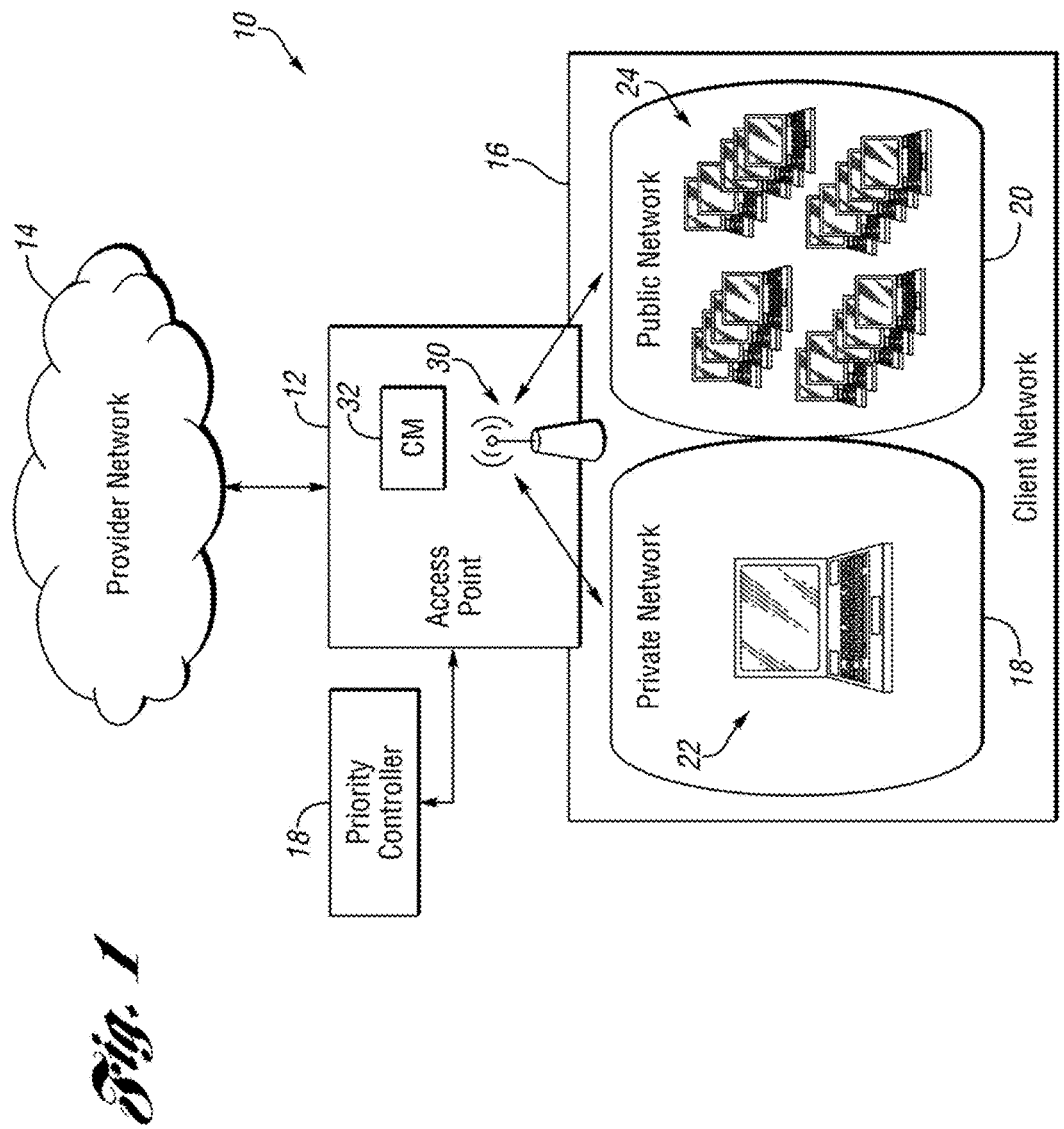
FIG. 1 illustrates a system having network prioritization in accordance one non-limiting aspect of the present invention.

FIG. 1 illustrates a system 10 having network prioritization in accordance one non-limiting aspect of the present invention. The system 10 is shown to include an access point 12 configured to facilitate network-based communications between a provider network 14 and a client network 16. A priority controller 18 may be included to prioritize usage of bandwidth or other resources related to facilitating communications between the provider network 14 and the client network 16. The provider network 14 may relate to any type of network, including a cable network, a hybrid fiber coaxial (HFC) network, a cellular network, an optical network, a wireless or Wi-Fi network, a wireline network or other types of network supported by a service provider in multiple system operator (MSO), such as one provided by a television service provider, a broadcast service provider, a satellite service provider, a cellular telephone service provider, a voice over Internet protocol (VoIP) service provider, an Internet service provider (ISP), etc. The client network 16 may correspond with a local wireless or wireline network supported at a location of a subscriber or other access location of the corresponding service provider.

The client network 16 is shown to be divided into a private network 18 and a public network 20. The private network 18 may correspond with a home network or other network having enhanced security or other limitations which require authorization or other consent prior to a device 22 being granted access. The public network 20 may correspond with a home network or other network, such as a Wi-Fi hotspot, associated with the same access point 12 but which does not include the same security or other limitations on devices 24 authorized for access, e.g., the private network 18 may be password protected by the subscriber and the public network 20 may not be password protected or the password protection may be known to roaming partners or devices associated with other subscribers. This type of arrangement may be common where a subscriber/operator desires to support private networking with a first plurality of users/devices 22 while at the same time supporting public or community networking with a second plurality of users/devices 24. Such an environment of use may correspond with a wireless network, particularly with a wireless network that supports roaming, since roaming or unsecured networks may experience situations in which devices 22, 24 are frequently added and removed from the network.

While the public network 20 and the private network 18 are shown to be singular. The networks 18, 20 may be further sub-divided and/or both networks 18, 20 may be private. The use of two private networks 18, 20 may be beneficial when the access point 12 is associated with a service provider (not shown) having capabilities to provide wireless or other network access at multiple client locations and/or to support wireless signaling with subscribers associated with other service providers, i.e., when a device is roaming between networks. The service provider(s) may provide secure or private access for their own subscribers that roam from one of the provider's locations to one associated with another service provider and/or when transitioning to another one of the provider's other locations. A subscriber of network services may be enabled to access purchased services at another subscriber's location upon completion of a roaming operation or sign-on operation. U.S. patent application Ser. No. 13/423,359, the disclosure of which is hereby incorporated by reference in its entirety, relates to one type of roaming operation where a device is able to move between subscriber locations with zero sign-on (ZSO).

The access point 12 is shown to broadcast both of the private and public networks 18, 20 from an antenna or radio interface 30 having capabilities sufficient for supporting wireless or wireline signaling. A cable modem 32 or other gateway may include or be operable with the antenna to further facilitate interfacing signaling with the provider network 14, such as in the manner described in U.S. patent application Ser. No. 13/652,700, the disclosure of which is hereby incorporated by reference in its entirety herein. The antenna 30 may be configured to interface signaling between the various devices 22, 24 and the cable modem 32. The antenna 30 may include one aerial, as shown, or multiple aerials and/or antenna elements, including configurations suitable to facilitating Multiple-Input Multiple-Output (MIMO) communications, such as that associated with U.S. patent application Ser. Nos. 14/181,640, 14/181,641, 14/181,643 and 14/181,645, the disclosures of which are hereby incorporated by reference in their entireties herein. One non-limiting aspect of the present invention contemplates the antenna 30 or additional antennas optionally being required to share available upstream and/or downstream bandwidth with the networks 18, 20 over the same frequency. While the present invention applies equally to multiple antenna configurations or access points 12 having other configurations where multiple devices may be enabled to communicate with the provider network 14 at the same time, the illustrated environment is particularly contemplated since it presents a problem where a plurality of user devices 22, 24 share a common radio interface or baseband processor, i.e. a common resource governed by a contention based access method, such as in the manner described in CableLabs Wireless Specifications, Wi-Fi Requirements For Cable Modem Gateways, WR-SP-WiFi-GW-I02-120216, the disclosure of which is hereby incorporated by reference in its entirety.

The priority controller 18 may be configured to facilitate prioritizing consumption of network resources according to characteristics of the devices 22, 24 and/or the private and public networks 18, 20. The consumption of network resources is predominately described with respect to consumption of upstream bandwidth as there may be sufficient downstream bandwidth to support simultaneously communicating with multiple devices. The upstream bandwidth may correspond with an upstream path defined from the access point 12 to the provider network 14 and/or a path defined from the devices 22, 24 to the access point 12. As is common in HFC and other systems where greater volumes of traffic are carried in a downstream direction, a greater amount of bandwidth may be allocated for downstream communications, i.e. in a direction from the provider network 14 to the client network 16, than that which is allocated for upstream communications, i.e. in a direction from the client network to the provider network. The present invention, however, applies equally to prioritizing communications in either one of the upstream and downstream directions, and as such, the present invention is not necessarily limited to prioritizing upstream communications. The priority controller 18 is shown to be a standalone entity but it may be included as part of the access point 12 and/or a device of the provider network 14 or client network 16.

The priority controller 18 may include a non-transitory computer-readable medium having non-transitory instructions operable to facilitate controlling the access point 12 and/or the devices 22, 24 to implement the network prioritization contemplated in U.S. patent application Ser. No. 13/537,707, the disclosure of which is hereby incorporated by reference in its entirety herein and in the manner described below in more detail. One non-limiting aspect of the present invention contemplates implementing the network prioritization to facilitate managing throughput, link rate, airtime, access, collision probability and other factors influencing performance for the wireless access point 12 when operating according to the Institute of Electrical and Electronics Engineers (IEEE) 802.11 standards (Wi-Fi), such as in accordance with Part 11: Wireless LAN Medium Access Control (MAC) and Physical Layer (PHY) specifications: Medium Access Control (MAC) Quality of Service Enhancements, the disclosure of which is hereby incorporated by reference in its entirety herein. The present invention is not necessarily limited to Wi-Fi and is equally application with other wireless networking, including those capable of engaging Distributed Coordination Function (DCF) based on Carrier Sense Multiple Access with Collision Avoidance (CSMA/CA) whereby each device 22, 24 desiring airtime executes a random binary backoff procedure before attempting to access a shared channel.

Internet service providers (ISPs) are increasingly offering IEEE 802.11 based Wi-Fi services to customers. The present invention contemplates leveraging the proliferation of Wi-Fi enabled devices and the demand for ubiquitous connectivity to increase ISP service coverage footprint. Since essentially all wireless transmissions are subject to free space path loss, the path loss (also known as isotropic spreading loss) represents the most basic and fundamental transmission loss model. The free space loss of an isotropic radiator may be given by equation (1) shown below:

$$FreeSpacePathLoss = 20*\text{Log}\left(\frac{4\pi d}{\lambda}\right) = 20*\text{Log}\left(\frac{4\pi df}{c}\right)$$

where d is distance in meters, λ is wavelength in meters, f is frequency in Hz and c is speed of light in meters per second.

In the community Wi-Fi use case, the distance between the transmitter and the receiver will generally be less than 100 feet. Because of this, the Free Space Loss equation above will suffice as a first order approximation of the propagation characteristics for outdoor users. Table 1 below shows an exemplary free space loss at 2.4 and 5 GHz.

| DISTANCE (FEET) | DISTANCE (METERS) | 2.4 GHZ LOSS (DB) | 5 GHZ LOSS (DB) |
| --- | --- | --- | --- |
| 3.3 | 1 | 40.0 | 46.4 |
| 6.6 | 2 | 46.1 | 52.4 |
| 13.2 | 4 | 52.1 | 58.5 |
| 26.4 | 8.1 | 58.1 | 64.5 |
| 32.8 | 10 | 60.0 | 66.4 |
| 65.6 | 20 | 66.1 | 72.4 |
| 131.2 | 40 | 72.1 | 78.5 |
| 196.8 | 60 | 75.6 | 82.0 |
| 328 | 100 | 78.1 | 84.5 |

Figure 2:
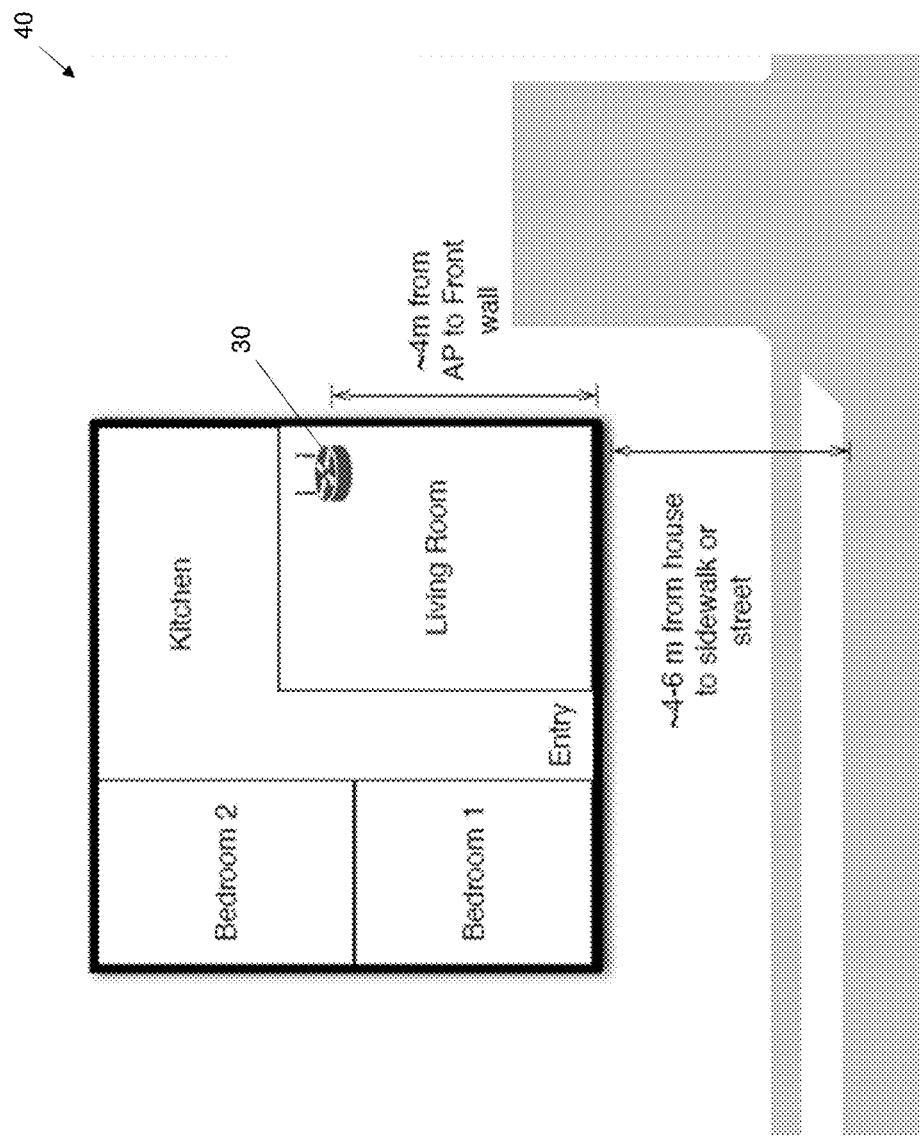
FIG. 2 illustrates a community wireless system in accordance with one non-limiting aspect of the present invention.

For indoor users, one signal propagation model may be the ITU indoor model (ITU-R RECOMMENDATION P.1238-7, Propagation data and prediction methods for the planning of indoor radio communication systems and radio local area networks in the frequency range 900 MHz to 100 GHz, 2012). This propagation model was developed for a frequency range that includes the 2.4 GHz and 5 GHz bands, and based on this model, propagation loss may be given by equation (2) shown below:

$$L_{total} = 20 * \log_{10}(f) + N * \log_{10}(d) + L_f(n) - 28$$

where Ltotal is loss in dB, f is frequency in MHz, N is the distance loss coefficient, d is distance from the access point (AP) to the client in meters, and Lf (n) is the floor loss penetration factor for n floors. In this model, the loss due to wall penetration and in room objects may be included in the distance loss coefficient. For residential construction, i.e. wood wall structure, the distance loss coefficient may be given as 28. Table 2 below shows the indoor propagation loss given by (2) assuming a single level (n=0) home/system 40 similar to FIG. 2.

| DISTANCE (FEET) | DISTANCE (METERS) | 2.4 GHZ LOSS (DB) | 5 GHZ LOSS (DB) |
|---|---|---|---|
| 3.3 | 1 | 39.6 | 47.3 |
| 6.6 | 2 | 48.0 | 55.7 |
| 13.2 | 4 | 56.5 | 64.1 |
| 26.4 | 8 | 64.9 | 72.6 |
| 32.8 | 10 | 67.6 | 75.3 |

One contemplated way to predict wireless coverage area is using a link budget model. In such a model, all power gains and losses are accounted for between the transmitter and the receiver. The resulting model predicts the maximum propagation loss tolerated by a functioning wireless link. For a Wi-Fi client, one possible link budget model is given by equation (3) shown below:

$$LinkLoss_{total} = P_{tx} + G_{tx} + L_{tx} + G_{rx} + L_{rx} - P_{rx} + L_m$$

where LinkLosstotal is the maximum tolerated propagation loss, Ptx is the AP transmit power, Gtx is the transmitter antenna gain, Ltx is the transmitter loss, Grx is the receiver antenna gain, Lrx is the receiver loss, Prx is the receiver minimum sensitivity of the client, and Lm is miscellaneous loss. (All values are in dB.) The maximum link budget of a common Wi-Fi link is approximately 110 dB from Tx chip to Rx chip. This is based on the following assumptions:

1. Both the transmitter and the receiver are using omni-directional antennas with 1 dB gain.
2. The transmitter is transmitting at 20 dBm.
3. The receiver minimum threshold is −88 dBm.
4. Transmitter and receiver losses are zero (ideal).
5. Miscellaneous loss is zero (ideal).

The above is based on the assumptions that are in some cases idealized. Regardless, it is clear that in the application of the Community Wi-Fi use case in a residential or small business setting, a large portion of users at the sidewalk or in the street will be at the edge of the coverage area for an indoor AP. In general, clients at the coverage area edge use a lower physical layer data rate than clients closer to the AP.

A fundamental problem in wireless communication is controlling access to the shared medium/channel. The media access control (MAC) layer defines the rules and procedures for channel access of a given protocol. Wi-Fi, as defined by the 802.11-working group of the Institute of Electrical and Electronic Engineers (IEEE), uses an access method called the Distributed Coordination Function (DCF). The design of the DCF is based on Carrier Sense Multiple Access with Collision Avoidance or CSMA/CA. In the DCF system, each device uses the following three basic steps when attempting to access the shared medium:

1. Perform a Clear Channel Assessment (CCA) by sensing the medium for a period of time before attempting to transmit. If the device determines that the medium is clear it proceeds to the next step.
2. Check the Network Allocation Vector (NAV), the virtual CCA mechanism, to ensure no hidden nodes are currently using the channel.
3. If the device determines the channel is busy in step 1 or 2, it sets a binary exponential backoff timer and waits before attempting the access the medium again, starting back at step 1. Otherwise, if the device senses the medium is not busy, the device can now transmit a frame.

For most traffic types, the amount of time the device must sense the medium in step one is the sum of the appropriate Interframe Space (IFS) plus the random binary back-off time called the Contention Window (CW). The IFS most often used is called the DCF IFS or DIFS. This may be a fixed parameter determined by the physical layer characteristics of the network. The DIFS is defined as 2×Slot Time+SIFS. In a few select cases the device may use a short IFS, or SIFS, to access the channel without adding the CW. This medium access method gives certain packets absolute priority access to the medium over those using the DIFS+CW method. These special cases include layer 2 acknowledgements, the response message to a Request-To-Send (RTS) frame called the Clear-to-Send (CTS) frame, data frames immediately following a CTS message, and any fragments of a fragmented frame after the first portion has been sent. There is a third IFS defined in the base 802.11 standards called the PCF IFS. However, Point Coordination Function (PCF) operation has seen little, if any, adoption so neither it, nor the PIFS will be discussed further.

Table 3 below provides a summary of the various IFS values.

| | 2.4 GHz | | | 5 GHz | |
|---|---|---|---|---|---|
| Phy | 802.11b | 802.11g | 802.11n | 802.11a | 802.11n |
| Slot Time | 20 us | Long GI = 20 us<br>Short GI = 9 us | Long GI = 20 us<br>Short GI = 9 us | 9 us | 9 us |
| SIFS | 10 us | 10 us | 10 us | 16 us | 16 us |
| DIFS | 50 us | Long GI = 50 us<br>Short GI = 28 us | Long GI = 50 us<br>Short GI = 28 us | 34 us | 34 us |

Figure 3:
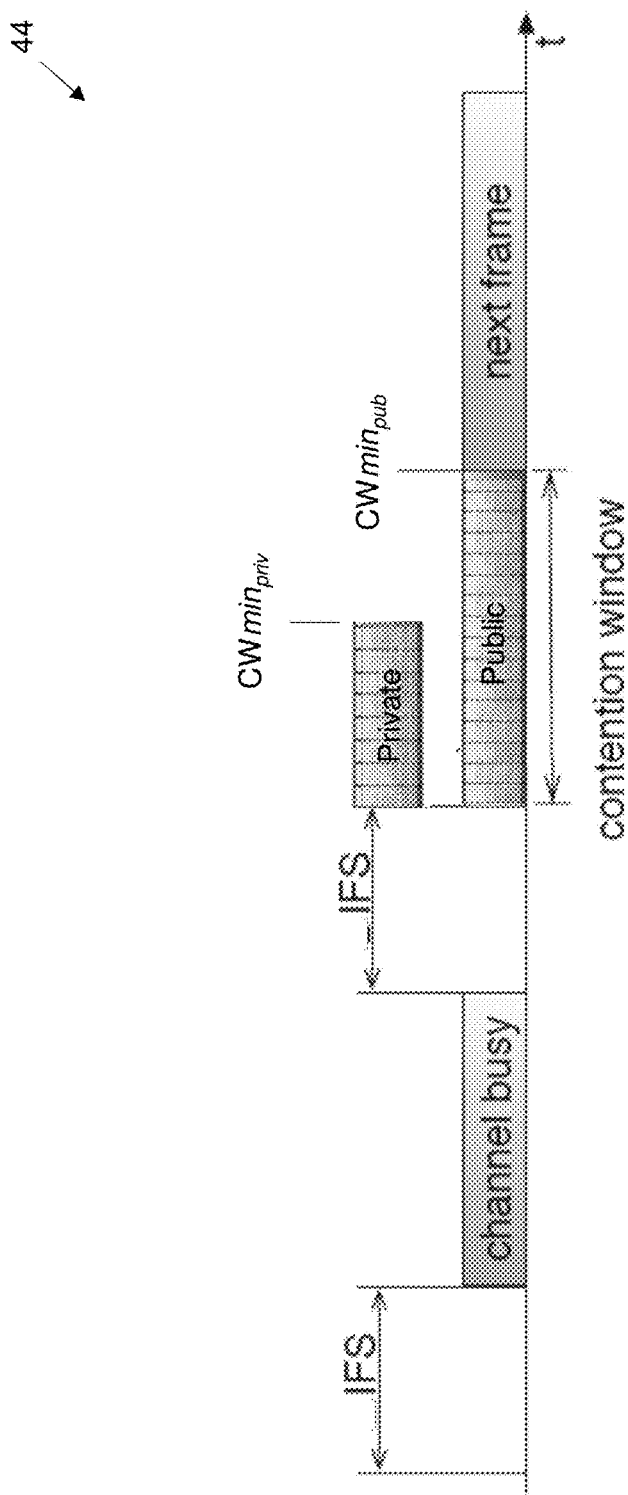
FIG. 3 illustrates a schematic for assigning contention windows in accordance with one non-limiting aspect of the present invention.

When devices on the network attempt to gain access to the channel, they use a random binary back-off procedure. In this procedure, during the first attempt to access the channel, a random value between zero and the contention window minimum value (CWmin) is chosen. In this fashion, the probability of collisions is reduced via each device choosing a random back-off value from a range. FIG. 3 illustrates a schematic 44 for assigning contention windows in accordance with one non-limiting aspect of the present invention.

Air interface packet collisions are detected by the absence of a layer-2 acknowledgement frame from the receiving party in response to a transmitted frame. Increasing the size of CWmin (content window) can increase the channel access latency, but it also reduces the probability of a collision. The contention window random backoff process is the basis of one non-limiting aspect of the present invention described below in more detail whereby the size of the CWmin maybe dynamically adjusted one a per device (e.g., devise 22, 24) or per network (e.g., networks 18, 20) basis to manage airtime as a function of metrics representing network conditions. In the Community Wi-Fi use case, the private network 18, servicing the home users, may want priority access to ensure compliance with a Service Level Agreement (SLA), either explicit or implicit, between the customer and the service provider. In such a scenario, one non-limiting aspect of the present invention contemplates ensuring that resources are first allocated to the private network 18 and any resources in excess of those needed to meet the SLA can then be allocated to the public network 20.

In Wi-Fi networks, throughput, though the primary interest of the user, may not be a good performance metric due to the large number of variables which effect single client and aggregate network throughput. For many instances, a metric called airtime is a better indicator of relative network resource allocation between a set of clients. Airtime, for the exemplary purposes described herein, may be the amount of time over a fixed interval that a given client has access to transmit on the shared channel. The relationship between user level throughput and airtime is upper-bounded and may be represented as in equation (4) shown below:

$$R_{client} \le R_{phy} * \frac{1}{n} * \frac{Airtime_{client}}{Airtime_{time}}$$

where Rclient is user throughput data rate, Rphy is the physical layer link data rate. The factor n is to account for the time needed by the DIFS, SIFS, and by the receiving node to send an acknowledgement frame. This scaling factor varies depending on the spectrum band used and version of 802.11 (e.g. .11a, .11b, .11g, etc) and takes a value in the range $1 \le n \le 2$. It can be easily seen from (4) that user level throughput is directly proportional to the airtime that a client receives.

The airtime needed to transmit a packet of Bpkt bytes of data may be given by equation (5) shown below:

$$Airtime_{pkt} \triangleq T_{DIFS} + \frac{B_{pkt}}{R_{phy}} + T_{SIFS} + T_{ack}$$

where Tdifs accounts for the time from DIFS, Tsifs is the time for a SIFS, and Tack accounts for the time needed to send the acknowledgement frame. From (5) it can be seen that the airtime needed to transmit a packet is inversely proportional physical layer data rate Rphy. As mentioned previously, clients farther from the AP will use lower physical layer data rates. Therefore, by combining the fair channel access of the DCF, with equations (4) and (5), clients at the edge of the network coverage area will use more airtime while getting lower throughput due to less efficient use of the airtime. As others have shown, the total network throughput may be upper bounded by the reciprocal of the harmonic mean of the physical layer data rates of the n clients on the network, as shown in equation (6) below.

$$R_{tot} \le \frac{1}{\frac{1}{n}\sum_{i=1}^{n}\frac{1}{R_{phyi}}} \le n * \min_{1 \le i \le n} R_{phyi}$$

Applying this concept to the Community Wi-Fi use contemplated herein it is clear that with a single radio AP the public network users, who will predominantly be farther from the access point than the private network 20, will undoubtedly have a negative effect on the overall network throughput, and therefore the private network 18 throughput.

One non-limiting aspect of the present invention contemplates a control algorithm that resolves uncontrolled resource allocation problem in the community Wi-Fi use case, such as but not necessarily limited to that described above where users farther from the access point 30 govern throughput. The proposed algorithm leverages the CWmin, the client count ratio between the networks, and the physical layer data rates of the clients within each network to manage airtime and strike a balance between access and prioritized throughput.

The contemplated airtime management may leverage capabilities available according to the CWmin adaptation support provided in many Wi-Fi devices according to IEEE 802.11e, the disclosure of which is hereby incorporated by reference in its entirety herein. In the exemplary Community Wi-Fi configuration, the present invention may manage air resource such that throughput thresholds are protected for the private network 18. Any air resources in excess of those needed to achieve the private network 18 throughput threshold can be then shared with the public network(s) 20 to provide service to roaming customers, etc. In this scenario, the networks 18, 20 are being managed as opposed to any single client. The number of private clients active at any given time may affect the resources being used by the networks 18, 20, and as such, the contemplated CWmin adaptation process may account for a varying client count ratio so that the appropriate per client channel access probability is assigned and the overall network channel access ratio is maintained. The contemplated management may be dynamic to account for scenarios such as active clients going into power save mode for long periods (inactive) or clients joining and leaving the network.

Airtime is directly proportional to both channel access probability as well as the physical layer link rate of the client(s) 22, 24. Since low rate clients govern the throughput behavior of a network, the present invention also contemplates controlling throughput or airtime, or both, with consideration of the physical layer link rate, e.g., the minimum link rate for devices 22, 24 in both networks 18, 20 may be compared to the object throughput rate when used for determining the CWmin of the public network 20. The CWmin adaptation algorithm proposed herein to accomplish these objectives may be designed to protect a predetermined throughput threshold for the private network 18. The algorithm may be designed to use the CWmin of the private network 18 (CWminpriv) as a baseline. The CWmin for the public network 20 (CWminpub) may then be scaled based on the physical layer link rate ratio and the client count ratio to provide a probability of channel access success ratio for the private network 20 that is sufficient to achieve the desired data rate. The scaling function may corresponding with equation (7) shown below as:

$$CWmin_{pub} = CWmin_{priv} + \left\lceil \log_2\left(\frac{n * R_{desired}}{R_{min}} * \frac{Count_{pub}}{Count_{priv}}\right)\right\rceil$$

Where desired is the desired throughput of the private network, n is a scaling function defined for each physical layer and accounts for protocol overhead (e.g. n=2 for 802.11g), Rmin is the minimum physical layer link rate of any active client 22, 24 in either network 18, 20, and Countpriv and Countpub are the active client counts in the private and public networks 18, 20, respectively. The active clients may be those actively attempting to gain access, those connected to one of the networks 18, 20 and/or those not in a sleep mode or otherwise not likely to consume services. The log base two function is used find the appropriate value for use with the current definition of CWmin with the ceiling function being used to always round up so that the threshold is protected absolutely.

The control algorithm in the contemplated implementation, may be represented in pseudocode as follows:

If (Active Client Count in Private>0 && Active Client Count in Public>0), Update CWminpub per equation (7)
  Else Use default CWminpub=5
  End In this way, when any network is the only network with an active client, a static DCF configuration maybe used, e.g., the CWminpriv and CWminpub may be set to a design value and kept there until a device becomes active on both networks 18, 20. However, when both networks have clients that are actively contending the channel, the relative channel access probability is governed by (7) to ensure the private network 18 receives the necessary resources for the desired throughput rate, e.g., CWminpriv may be fixed and CWminpub may be dynamically adjusted based on various metrics/ratios.

The proposed algorithm and proof of concept implementation described in the provisional application incorporated by reference herein provide evidence that the contemplated management may be capable of addressing the resource protection goal of Community Wi-Fi implementations. However, during the development and testing phases, areas of future optimization were identified. First, the inability to use integer step sizes, at least for IEEE 802.11e, for CWmin adjustments may be a hindrance to the optimal tuning of the parameter. For the proof of concept implementation the ceiling function was used to ensure sufficient priority for the private network. However, an alternative approach is to use dithering to rapidly modulate the CWmin value to achieve and effective CWmin that is between the power of two steps currently available. The second optimization may be to tune the control process with some measure of hysteresis such that rapid fluctuations in physical layer link rate were smoothed from the viewpoint of (7). Such a smoothing process may provide a more stable CWmin for the public network 20.

Figure 4:
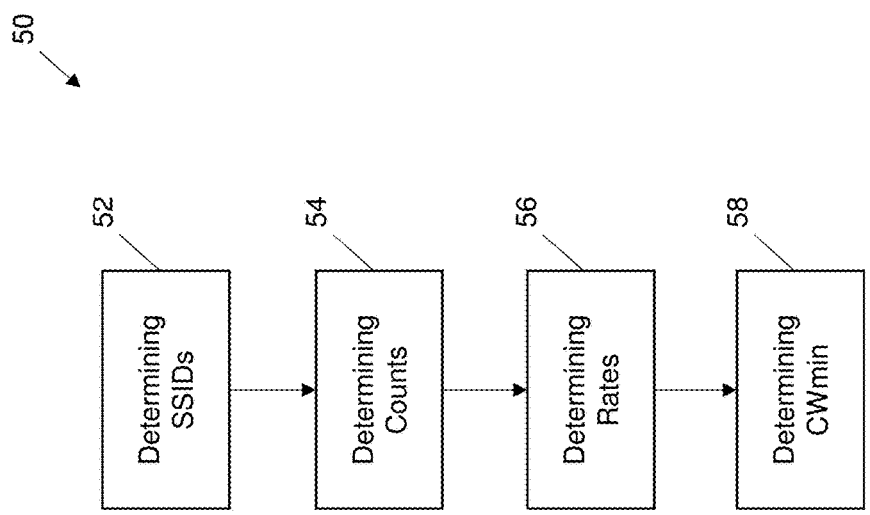
FIG. 4 illustrates a flowchart for a method of managing an access point in accordance with one non-limiting aspect of the present invention.

FIG. 4 illustrates a flowchart 50 for a method of managing an access point in accordance with one non-limiting aspect of the present invention. The method is predominately described for exemplary non-limiting purposes with respect to managing a wireless access point configured to simultaneously support wireless signaling for two network (e.g. public and private networks) over the same radio frequency/channel. This is done without necessarily intending to limit the scope and contemplation of the present invention as the management contemplated herein may be similarly used to facilitate managing three or more networks over the same radio frequency/channel. The method is also predominantly described for exemplary, non-limiting purposes with respect to a contention-based process where devices attempting to access airtime over either one of the public and private networks are required to execute a backoff procedure prior to attempting to access the channel. The backoff procedure may be characterized by each device attempting to access the channel during a backoff slot selected, optionally randomly, from a plurality of backoff slots defined in a corresponding contention window, such as but not necessarily limited to the manner described in the specifications associated with IEEE 802.11.

Block 52 relates to determining an SSID for each of the networks sharing the radio channel. The SSID may be broadcasted from the access point and correspondingly ascertained by the devices, such as when authenticating or otherwise engaging operations necessary to connect with the access point. The access point may include a table or other listing of SSIDs associated with a particular one or more of its antennas or antennas elements, e.g., the wireless access point may be configured to support multiple community-Wi-Fi implementations over the same antenna or additional antennas where each network grouping shares different channels (e.g., one set of private and public networks at a first frequency and another set of public and private networks at a second frequency). The access point may also list in the table or otherwise track the devices connected to or associated with each SSID so as to identify each device (MAC, IP address, etc.) as well as whether the device is currently active or inactive. The wireless access point is uniquely positioned to assess characteristics and other metrics regarding the devices connected thereto that the devices themselves may not be able to ascertain, such as the SSID utilized by each device similarly associated with the access point.

Block 54 relates to determining counts sufficient for representing the number of for devices actively connected to each of the SSIDs. The counts may represent the number of devices contending for airtime or other resources via the shared channel. In some cases, a device may be connected to the access point but not otherwise attempting to consume resources, such as if the device is sleeping or otherwise inactive for a long period of time, and the counts may consider such operating conditions when counting or not counting a device. The counts may be one of the metrics known to the access point and unknown to the connected devices contemplated for use with the present invention in facilitating management of the shared channel. In the exemplary scenario a Countpriv may indicate the number of devices connected to the private network and a Countpub may indicate the number devices connected to the public network. The access point may continuously track the counts for each network on a regular basis, such as every few seconds or minutes, and/or when other events occur, such as when devices newly connected to or leave the one of networks.

Block 56 relates to determining rates for representing desired and/or actual data throughput between the access point and the devices. Each SSID may be assigned a desired throughput, e.g., the private network may be assigned a higher throughput than the public network and or vice versa, as a design parameter intended to represent desired operation of the access point. A link rate or other throughput measure may also be determined to measure data rates actually being achieved between the access point and each of the devices. The link rate, as noted above, can influence overall system performance in achieving the desired throughput, particularly when devices are connected to an edge of the shared radio channel. While the present invention fully contemplates maintaining desired throughputs for one or more public networks, this exemplary description contemplates a use case where the public network is given best efforts while attempting to maintain the private network as close to a desired throughput (Rdesired) as possible. A throughput of each device, regardless of whether the devices are connected to the public or private network, may be measured and the link rate of a slowest one of the devices may be determined as Rmin. Rdesired Rmin may be metrics known to the access point and unknown to the devices (the devices may know their own link rate but not that of the other devices).

Block 58 relates to determining contention windows (backoff slots) or other mechanism suitable to controlling access for each of the networks sharing the radio channel. The contention window assigned to each device may be determined based on the metrics noted above and desired operational consideration to manage the probability of each device gaining network access in manner sufficient to achieve the desired operation of the private network and best efforts for the public network. The contention windows may be allocated on a per-SSID basis such that the same contention window is used for each device connected to the same SSID. The ability to implement SSID-based assignment of the contention windows may be beneficial in enabling adjustments to be continuously made to one network without having to adjust both networks, e.g., the private network contention window (CWminpriv) can be fixed and the public network contention window (CWminpub) can be continuously adjusted in order to maintain the public network at desired operation levels. One non-limiting aspect of the present invention contemplates setting/fixing the CWminpriv and scaling the CWminpub according to a scaling function or other operand according to measured/known metrics in order to achieved the desired operation of the private network.

The CWminpub may be dynamically scaled according to the CWminpriv as a function of the Rdesired and the Rmin such that the CWminpub increases when the slowest link rate decreases in proportion to the throughput and such that the CWminpub decreases when the slowest link rate increases in proportion to the throughput. The CWminpub may be dynamically scaled according the CWminpriv as a function of the Countpub and the Countpub such that the CWminpub increases when the Countpub increases relative to Countpriv and such that the CWminpub decreases when the Countpub decreases relative to the Countpriv. FIG. 3 illustrates a scenario where the CWminpriv is less than or shorter than the CWminpub for exemplary non-limiting purposes as it may be desirable to keep CWminpriv less than CWminpub when a certain number of devices are connected each of the corresponding SSIDs. The CWminpriv need not necessarily be shorter than the CWminpub, such as when the number of devices connected to the corresponding SSIDs and/or the rates associated there with are sufficiently skewed such that desired performance of the private SSID maybe be achieved even when the CWminpub is less than the CWminpriv.

The rate and count based scaling may optionally be combined according to the scaling function shown below in order to accommodate each metric in the scaling of CWminpub.

$$CWmin_{pub} = CWmin_{priv} + \left\lceil \log_2 \left( \frac{n * R_{desired}}{R_{min}} * \frac{Count_{pub}}{Count_{priv}} \right) \right\rceil$$

The CWminpriv value is described above as being fixed and/or set according to a desired value and thereafter scaled according to metrics representative network conditions in order to calculate an appropriate CWminpub. The CWminpriv is not necessarily required to be fixed throughout operation and may be varied over time for any number of reasons, including when throughput or other performance requirements of the private network change, such as when the private network is controlled to provide different levels of QoS depending on traffic, subscriptions, services, etc. The access point may be configured to adjust the metrics as desired to change how resources are managed for the shared channel. The results calculated for CWminpub may be limited due to mathematical operands such that only certain integer values are achievable such that It may be desirable in some cases to calculate or achieve a CWminpub public between these integer values and/or to smooth transitions when switching from one CWminpub value to another CWminpub of value. Accordingly, the present invention contemplates dithering between two integer values for CWminpub by rapidly switching between the two integer values to produce the effect of a non-integer intermediate value and smoothing a transition between two integer values for CWminpub by gradually increasing or decreasing the CWminpub when transitioning between the two integer values such that the CWminpub is at least set to one intermediary value before being set to one of the two integer values While the foregoing describes a two-network configuration, similar methodology may be performed for scaling CWminpub for multiple public networks relative to a desired CWminpriv. The following scaling function may be implement with three or more networks (N networks) where a mth contention window for devices associated with an mth SSID (m equals {1, 2, . . . , N}) deemed as the private network is fixed.

$$CWmin_{m+1} = CWmin_m + \left\lceil \log_2 \left( \frac{n * R_{desired}}{R_{min}} * \frac{Count_{m+1}}{\sum_{i=1}^{N} Count_i} \right) \right\rceil$$

wherein $CWmin_{m+1}$ is the m+1$^{th}$ contention window, $CWmin_m$ is the m$^{th}$ contention window, Rdesired is desired throughput for the access point, Rmin is a slowest link rate for any device actively associated with any one of the mth SSIDs, $Countp_m$ is a count of active devices associated with the mth SSID, $Count_{m+1}$ is a count of active devices associated with the m+1$^{th}$ SSID and n is a scaling value.

One non-limiting aspect of the present invention contemplates a Wi-Fi Uplink QoS Control Algorithm via CWmin Adaptation where, in the Community Wi-Fi use case where there is a private and public SSID are served via a single Wi-Fi radio, uplink resource management is controlled. By controlling the CWmin value of the public SSID relative to the private SSID, the probability of success when attempting to gain access to the shared channel can be controlled to achieve the desired performance for the private SSID.

One non-limiting aspect of the present contemplates a Wi-Fi Network Real-Time Throughput Estimation where an algorithm for predicting or estimating an upper bound on a Wi-Fi networks aggregate throughput based on information available to the AP is monitored. As Wi-Fi APs are deployed with the intention of supporting more services (Voice, Video, public and private data, security, IoT) the need for better troubleshooting tools increases greatly. This present invention contemplates a method to predict or estimate an upper bound on the available Wi-Fi throughput based on client count and the physical layer data rate of each client for the purposed of implementing corresponding control of CWminpub and CWminpriv. The contemplated estimation method may be used to provide an upper bound to the network throughput when all stations have full buffer traffic loads i.e. saturation conditions. Alternatively the estimate can be weighted based on traffic load data (or assumptions) for each client in the network.

One non-limiting aspect of the present contemplates a Service Aware Wi-Fi QoS for Community Wi-Fi where a Wi-Fi air interface QoS mechanism uses a priori knowledge of device-to-service mappings to adjust target throughput it is protecting for the private SSID in the Community Wi-Fi use case. This dynamic method allows the algorithm to ensure good user experiences for highly leveraged Wi-Fi networks operating on a single radio.

The foregoing concepts include capabilities for estimating Wi-Fi network throughput in real time and also a dynamic QoS function that uses static thresholds. This invention takes user input or smart device identification to determine the throughput threshold to protect via the method described above (CWmin adaptation). Consider a case where a subscriber has data and video services utilizing the Wi-Fi interface. The subscriber may have 2 wireless TVs and 2 data usage devices. The algorithm would assign a target data rate to each device. When each device became active on the network, the QoS rate control algorithm would appropriately adjust the target data rate it was protecting, thus effecting the CWmin adaptation algorithm to accordingly de-prioritize public SSID user traffic. In this way the QoS mechanism on the air interface would become service aware and vary its level of protection for the private service set based on real time usage needs. This dynamic method prevents overly defensive settings from harming the public user experience when the private user devices are dormant, and ensures a good user experience for the private user when they are using their MSO offered services.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having non-transitory instructions operable with an access point configured to wirelessly support at least two networks over a single radio channel, each network being uniquely identified with a Service Set Identifier (SSID), the non-transitory instructions being sufficient for:
   assigning a first contention window for devices associated with a first SSID, the first contention window arbitrating access to the network having the first SSID;
   assigning a second contention window for devices associated with a second SSID, the second contention window arbitrating access to the network having the second SSID;
   determining one or more metrics used to scale the first contention window to include a throughput desired for devices associated with the first SSID and a slowest link rate for any device associated with one of the first and second SSIDs;
   dynamically scaling the first contention window as a function of the throughput and the slowest link rate such that the second contention window increases when the slowest link rate decreases in proportion to the throughput and such that the second contention window decreases when the slowest link rate increases in proportion to the throughput;
   dithering between two integer values for a public network contention window minimum value ($CWmin_{pub}$), the dithering characterized by rapidly switching between the two integer values to produce the effect of a non-integer intermediate value; and
   smoothing a transition between two integer values for the $CWmin_{pub}$, the smoothing characterized by gradually increasing or decreasing the $CWmin_{pub}$ when transitioning between the two integer values such that the $CWmin_{pub}$ is at least set to one intermediary value before being set to one of the two integer values.

2. The non-transitory computer-readable medium of claim 1, further comprising non-transitory instructions sufficient for determining the second contention window by scaling the first contention window according to the one or more metrics representing network conditions for the networks sharing the single radio channel.

3. The non-transitory computer-readable medium of claim 1, further comprising non-transitory instructions sufficient for determining the one or more metrics used to scale the first contention window to include a first count representing a number of devices actively associated with the first SSID and a second count representing a number of device actively associated with the second SSID.

4. The non-transitory computer-readable medium of claim 3, further comprising non-transitory instructions sufficient for dynamically scaling the first contention window as a function of the first and second counts such that the second contention window increases when the second count increases relative to the first count and such that the second contention window decreases when the second count decreases relative to the first count.

5. The non-transitory computer-readable medium of claim 3, further comprising non-transitory instructions sufficient for assigning a third contention window for devices associated with the second SSID when the first count is zero, including determining the third contention window without scaling the first contention window.

6. The non-transitory computer-readable medium of claim 1, further comprising non-transitory instructions sufficient for:
   determining the one or more metrics to include:
   i) a throughput desired for devices associated with the first SSID;
   ii) a minimum link rate for any device;
   iii) a first count representing a number of devices actively associated with the first SSID; and
   iv) a second count representing a number of device actively associated with the second SSID; and
   scaling the first contention window according to a scaling function to determine the second contention window, the scaling function being:

$$CWmin_{pub} = CWmin_{priv} + \left\lceil \log_2\left(\frac{n * R_{desired}}{R_{min}} * \frac{Count_{pub}}{Count_{priv}}\right)\right\rceil$$

wherein the $CWmin_{pub}$ is the second contention window, $CWmin_{priv}$ is a private network contention window minimum value and the first contention window, $R_{desired}$ is the throughput, $R_{min}$ is the minimum link rate, $Count_{priv}$ is the first count, $Count_{pub}$ is the second count and n is a scaling value.

* * * * *